(12) United States Patent
Snyder et al.

(10) Patent No.: US 11,227,287 B2
(45) Date of Patent: Jan. 18, 2022

(54) COLLABORATIVE ANALYTICS FOR FRAUD DETECTION THROUGH A SHARED PUBLIC LEDGER

(71) Applicant: International Business Machines Corporation, Armonk, NY (US)

(72) Inventors: Jessica G. Snyder, Raleigh, NC (US); Yi-Hui Ma, Cumberland, PA (US); Thomas T. Hanis, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 16/022,179

(22) Filed: Jun. 28, 2018

(65) Prior Publication Data
US 2020/0005308 A1 Jan. 2, 2020

(51) Int. Cl.
*G06Q 20/40* (2012.01)
*G06Q 20/10* (2012.01)

(52) U.S. Cl.
CPC ......... *G06Q 20/4016* (2013.01); *G06Q 20/10* (2013.01)

(58) Field of Classification Search
CPC .................................................. H04L 2209/38
See application file for complete search history.

(56) References Cited

U.S. PATENT DOCUMENTS

| | | | | |
|---|---|---|---|---|
| 6,119,103 A * | 9/2000 | Basch | ................... | G06Q 20/341 705/35 |
| 7,801,890 B1 * | 9/2010 | Alexander | ............. | G06Q 30/06 707/732 |
| 7,827,045 B2 | 11/2010 | Madill et al. | | |
| 8,600,873 B2 * | 12/2013 | Fisher | ................. | G06Q 30/0185 705/38 |
| 8,924,279 B2 | 12/2014 | Liu et al. | | |
| 10,554,649 B1 * | 2/2020 | Fields | ................... | H04L 9/3263 |
| 10,762,506 B1 * | 9/2020 | Cash | .................. | G06K 9/00087 |

(Continued)

OTHER PUBLICATIONS

Gundapaneni, Dheeraj, "Fraud and Performance Monitoring of Credit Card Tokenization Using Business Intelligence" (2015). Culminating Projects in Mechanical and Manufacturing Engineering. 14. (Year: 2015).*

(Continued)

*Primary Examiner* — Ryan D Donlon
*Assistant Examiner* — Mark A Malkowski

(57) ABSTRACT

An example operation may include one or more of a computer deriving a first set of metrics from processing a first and second set of data analytics, the sets associated with a subject matter. The operation further comprises the one or more computer deriving a second set of metrics from processing a third and fourth sets of data analytics, the third and fourth sets associated with the subject matter. The operation further comprises the one or more computer publishing the first and second set of metrics. The operation further comprises the one or more computer receiving a first plurality of requests for processing of analytics using the first set of metrics. The operation further comprises the one or more computer receiving a second plurality of requests for processing of analytics using the second set of metrics. The operation further comprises the one or more computer maintaining tallies of the requests.

16 Claims, 14 Drawing Sheets

(56) References Cited

U.S. PATENT DOCUMENTS

| | | | |
|---|---|---|---|
| 2005/0091524 A1* | 4/2005 | Abe | G06Q 20/341 |
| | | | 726/26 |
| 2007/0288453 A1 | 12/2007 | Podilchuk | |
| 2008/0086466 A1 | 4/2008 | Baker | |
| 2009/0299824 A1 | 12/2009 | Barnes, Jr. | |
| 2010/0036684 A1 | 2/2010 | McNamee et al. | |
| 2010/0293034 A1* | 11/2010 | Olejniczak | G06Q 30/0201 |
| | | | 705/14.45 |
| 2012/0167162 A1* | 6/2012 | Raleigh | H04L 63/10 |
| | | | 726/1 |
| 2012/0179498 A1 | 7/2012 | Aharoni et al. | |
| 2012/0246060 A1 | 9/2012 | Conyack, Jr. et al. | |
| 2012/0259753 A1 | 10/2012 | Orad et al. | |
| 2012/0310838 A1* | 12/2012 | Harris | G06Q 20/3276 |
| | | | 705/65 |
| 2013/0204657 A1 | 8/2013 | Ghosh et al. | |
| 2014/0081652 A1 | 3/2014 | Klindworth | |
| 2015/0170243 A1* | 6/2015 | He | G06Q 30/0621 |
| | | | 705/26.5 |
| 2015/0178374 A1* | 6/2015 | Rahat | G06F 21/316 |
| | | | 707/740 |
| 2015/0178825 A1 | 6/2015 | Huerta et al. | |
| 2016/0050192 A1* | 2/2016 | Banerjee | H04L 63/0823 |
| | | | 726/6 |
| 2016/0342989 A1* | 11/2016 | Davis | G06Q 20/3827 |
| 2016/0342994 A1 | 11/2016 | Davis | |
| 2017/0270534 A1 | 9/2017 | Zoldi et al. | |
| 2018/0006831 A1 | 1/2018 | Toll et al. | |
| 2018/0089638 A1 | 3/2018 | Christidis et al. | |
| 2018/0123882 A1* | 5/2018 | Anderson | H04L 43/16 |
| 2018/0204217 A1 | 7/2018 | Bedi et al. | |
| 2019/0036678 A1* | 1/2019 | Ahmed | H04L 9/302 |
| 2019/0327259 A1* | 10/2019 | DeFelice | G06N 3/084 |
| 2019/0370813 A1 | 12/2019 | Bravick et al. | |

OTHER PUBLICATIONS

Bogdanov, "Students and Taxes: a Privacy-Preserving Study Using Secure Computation" https://petsymposium.org/2016/files/papers/Students_and_Taxes_a_Privacy-Preserving_Study_Using_Secure_Computation.pdf, 2016 (Year: 2016).*

Nabi, "Comparative Study on Identity Management Methods Using Blockchain", https://files.ifi.uzh.ch/CSG/staff/Rafati/ID%20Management%20using%20BC-Atif-VA.pdf, https://www.csg.uzh.ch/csg/en/publications.html, Published Sep. 2017 (Year: 2017).*

Reed, "The Technical Foundations of Sovrin", https://www.evernym.com/wp-content/uploads/2017/07/The-Technical-Foundations-of-Sovrin.pdf, (Year: 2016).*

List of IBM Patents or Patent Applications Treated as Related, Jul. 10, 2018.

Jessica G. Snyder, Collaborative Analytics for Fraud Detection Through a Shared Public Ledger, U.S. Appl. No. 16/022,133, filed Jun. 28, 2018 (not provided as this application is available to the Examiner).

Ethoca, products. Retrieved from Internet Jan. 14, 2018 using: https://www.ethoca.com/products.

Hoang Tam Vo, Lenin Mehedy, Mukesh Mohania, Ermyas Abebe, "Blockchain-based Data Management and Analytics for Micro-Insurance Applications," CIKM '17 Proceedings of the 2017 ACM on Conference on Information and Knowledge Management, pp. 2539-2542.

Shina Panicker, Rishabh Srivastava, "Emerging Role of Data Analytics in Combating Financial Frauds: The Era of Big Data in India," ICEGOV '17 Proceedings of the 10th International Conference on Theory and Practice of Electronic Governance, pp. 167-173.

Varun Chandola, Sreenivas R. Sukumar, Jack C. Schryverv, "Knowledge Discovery from Massive Healthcare Claims Data," KDD '13 Proceedings of the 19th ACM SIGKDD international conference on Knowledge discovery and data miningpp. 1312-1320.

Vijay Iyengar, Ioana Boier, Karen Kelley, Raymond Curatolo, "Analytics for audit and business controls in corporate travel & entertainment," AusDM '07 Proceedings of the sixth Australasian conference on Data mining and analytics—vol. 70, pp. 3-12.

Camino, Finding Suspicious Activities in Financial Transactions and Distributed Ledgers,Retrieved from https://ieeexplore.ieee.org/abstract/document/8215741 (Year: 2017).

Hafiz, "The Use of Predictive Analytics Technology to Detect Credit Card Fraud in Canada", https://ieeexplore.ieee.org/document/ 7521522, IEE, 2016 (Year: 2016).

* cited by examiner

| Rule | Feature_1 | Feature_2 | % Activation |
|---|---|---|---|
| 3 or more transactions involving a High Risk Jurisdiction in a 14 day period to the same BNF aggregating to at least $50,000 and each transaction is at least $5,000 | # of High Risk Jurisdiction TXN in a 14 day period<br>threshold<br>>=3 | $amount by counterparty in a 14 day period<br>threshold<br>>=50,000 | % of activation for Feature 1 = 80%<br><br>% of activation for Feature 2 = 90% |
| 20 or more transactions in a 30 day period and the aggregate amount is $3,000 or greater | # of TXN in a 30 day period<br>threshold<br>>=20 | $amount in 30 day<br>threshold<br>>=3000 | |

FIG. 1B

COLLABORATIVE ANALYTICS FOR FRAUD DETECTION THROUGH A SHARED PUBLIC LEDGER

TECHNICAL FIELD

This application generally relates to the use of blockchains in financial transactions, and more particularly, to the use of blockchains in detecting fraud in bank deposit operations.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in the blockchain blocks, which are secured from tampering and revision due to their immutable properties. Each block contains a timestamp and a link to a previous block. A blockchain can be used to hold, track, transfer and verify information. Since a blockchain is a distributed system, before adding a transaction to the blockchain ledger, all peers need to reach a consensus status.

Depositor confidence in bank stability is essential to economic health. While seeking stability and growth in their deposit bases, banks desire continued depositor confidence in the safety of their deposits. Institutions seek to understand patterns of measurable behavior by depositors and others that affect lending capacity. As customer deposits and bank capital form bases for lending activity, banks seek to understand depositor behavior as well as minimize risk of fraudulent activity associated with deposits. Such behaviors are measurable and observable and may be anticipated with proper tools.

Large financial institutions share similar concerns as fraudulent activity that is successful often spreads from one institution to another, with negative impact on local and regional economies and beyond. A malicious party that is successful in defrauding a first bank may very well attempt similar fraudulent activities at a second bank, particularly when the second bank is similar to the first bank in size, structure, and deposit base. Institutions may benefit by sharing effective elements of categories of data assessment without sharing proprietary information including analytical models the institutions use.

As complexity of financial instruments expands and fraudulent parties become more sophisticated, institutions seek new approaches and technologies to address financial crime as well as non-criminal but delinquent and irresponsible behavior. Institutions need to react more quickly to perceived and actual risks. Computer-driven fraud and fungibility and international mobility of funds can transform a seemingly innocuous and manageable risk into a catastrophic loss in a short time.

Institutions may find that sharing resources among themselves including some deposit-related information, for example fraud analytics, may be helpful in addressing financial crime and other malicious behaviors. Card providers and merchants were early to cooperate to address fraud and identity theft issues.

In complying with state, federal, and international regulations, institutions may satisfy requirements by sharing data, profiles, and patterns of interest with each other and with regulators. While channels exist for publications, documented research work, and conference media for sharing of intelligence, these channels have not adapted to the speed, elusiveness, and adaptability of today's international fraud operators. Banks, regulators, and others would benefit from sharing of synthesized views of approaches and techniques used to analyze and segment deposit data from a broad population of parties employing a variety of tools. As such, what is needed is something else to overcome the described limitations and facilitate the sharing of such synthesized views.

SUMMARY

One example embodiment may provide a method that includes one or more of a computer storing a first set of received data analytics in a blockchain, the first set associated with a subject matter, the computer storing a second set of received data analytics in the blockchain, the second set associated with the subject matter, the computer deriving and storing in the blockchain a first set of metrics based on analysis of the first set of analytics processed with the second set of analytics, the computer storing a third set of received data analytics in the blockchain, the third set associated with the subject matter, and the computer deriving and storing in the blockchain a second set of metrics based on analysis of the first set of metrics processed with the third set of data analytics.

Another example embodiment may provide a system that includes a processor and memory, wherein the processor is configured to store a first set of received data analytics in a blockchain, the first set associated with a subject matter, store a second set of received data analytics in the blockchain, the second set associated with the subject matter, derive and store in the blockchain a first set of metrics based on analysis of the first set of analytics processed with the second set of analytics, store a third set of received data analytics in the blockchain, the third set associated with the subject matter, and derive and store in the blockchain a second set of metrics based on analysis of the first set of metrics processed with the third set of data analytics.

A further example embodiment may provide a non-transitory computer readable medium comprising instructions, that when read by a processor, cause the processor to perform one or more storing a first set of received data analytics in a blockchain, the first set associated with a subject matter, storing a second set of received data analytics in the blockchain, the second set associated with the subject matter, deriving and storing in the blockchain a first set of metrics based on analysis of the first set of analytics processed with the second set of analytics, storing a third set of received data analytics in the blockchain, the third set associated with the subject matter, and deriving and storing in the blockchain a second set of metrics based on analysis of the first set of metrics processed with the third set of data analytics.

A further example embodiment may provide a method that includes one or more of a computer deriving a first set of metrics from processing a first set of data analytics with a second set of data analytics, the sets associated with a subject matter, the computer deriving a second set of metrics from processing a third set of data analytics with a fourth set of data analytics, the third and fourth sets associated with the subject matter, the computer publishing the first set of metrics and the second set of metrics, the computer receiving a first plurality of requests for processing of data analytics using the first set of metrics, the computer receiving a second plurality of requests for processing of data analytics using the second set of metrics, and the computer maintaining tallies of the first plurality and the second plurality of requests.

A further example embodiment may provide a system that includes a processor and memory, wherein the processor is configured to derive a first set of metrics from results of a first set of data analytics processed with a second set of data analytics, the sets associated with a subject matter, derive a second set of metrics from results of a third set of data analytics processed with a fourth set of data analytics, the third and fourth sets associated with the subject matter, publish the first set of metrics and the second set of metrics, receive a first plurality of requests to process of data analytics using the first set of metrics, receive a second plurality of requests to process of data analytics using the second set of metrics, and maintain tallies of the first plurality and the second plurality of requests.

A further example embodiment may provide a non-transitory computer readable medium comprising instructions, that when read by a processor, cause the processor to perform one or more deriving a first set of metrics from processing a first set of data analytics with a second set of data analytics, the sets associated with a subject matter, deriving a second set of metrics from processing a third set of data analytics with a fourth set of data analytics, the third and fourth sets associated with the subject matter, publishing the first set of metrics and the second set of metrics, receiving a first plurality of requests for processing of data analytics using the first set of metrics, receiving a second plurality of requests for processing of data analytics using the second set of metrics, maintaining tallies of the first plurality and the second plurality of requests.

BRIEF DESCRIPTION OF THE DRAWINGS

FIG. 1B illustrates a chart describing an example ledger entry depicting features and patterns in an activity burst model of collaborative analytics for fraud detection through a shared public ledger according to an embodiment of the present disclosure.

DETAILED DESCRIPTION

Figure 1A:
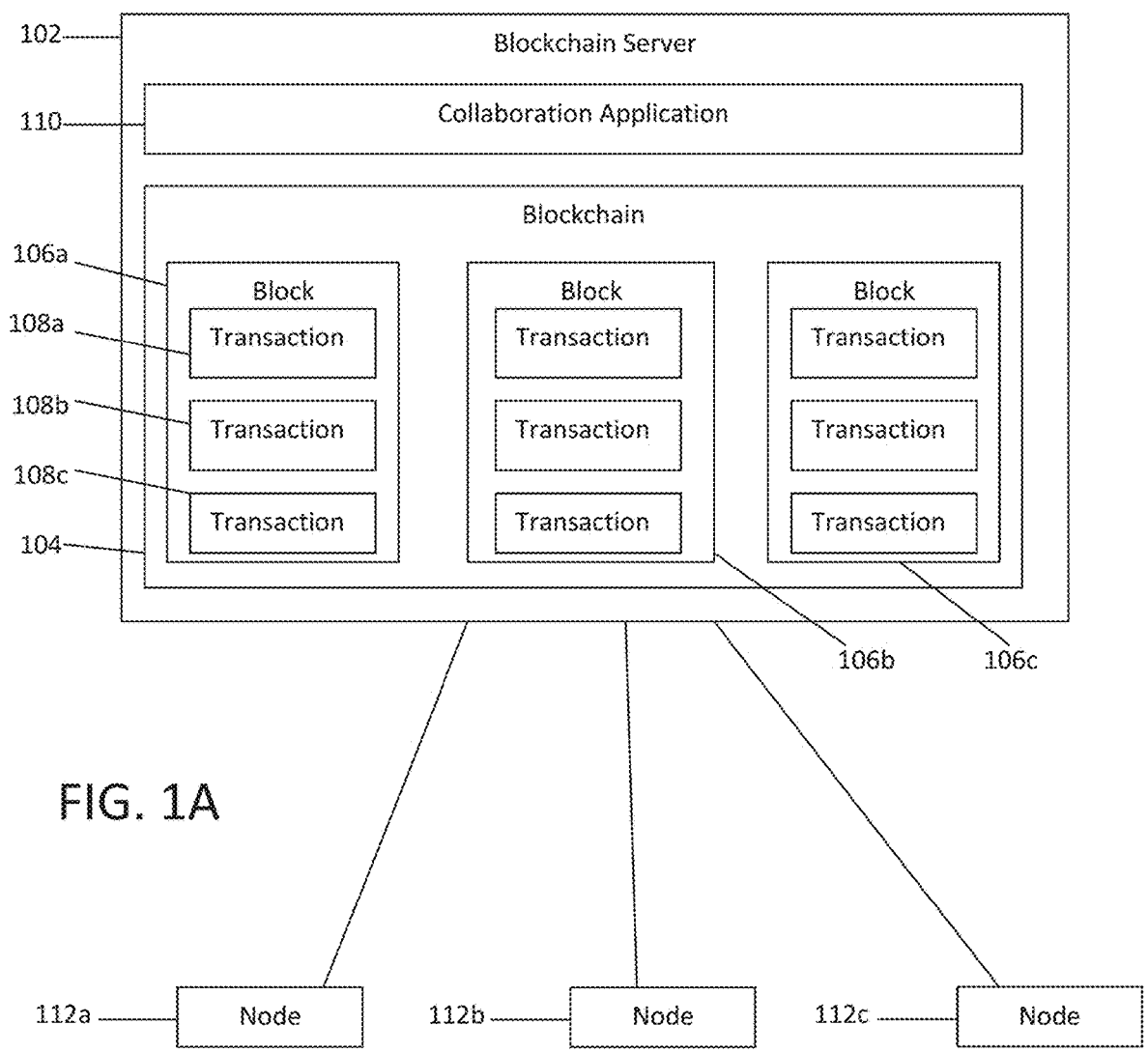
FIG. 1A illustrates a network diagram of collaborative analytics for fraud detection through a shared public ledger, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, non-transitory computer readable media, devices, and/or networks, which provide (Insert the title and any related information here).

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

The example embodiments are directed to methods, devices, networks and/or systems, which support a blockchain system. A blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein.

Systems and methods described herein provide for processing and storage of data, analytics, and metrics derived from the data and analytics in distributed ledgers. The data and analytics may be associated with bank deposit, lending, and related commercial activities. A blockchain structure stores data analytics provided by financial institutions, for example banks including commercial banks, savings and loan banks, and credit unions. The data analytics may be primarily associated with observed and potential fraudulent activity directed to institutions' deposit management operations.

Institutions may perform data mining on their own deposit bases and generate data analytics therefrom using proprietary and other quantitative models. Such institutions may participate in blockchains where data and analytics the institutions submit to the blockchain are immutably stored in the blockchain and analyzed with other participating institutions' analytics to generate useful metrics. Participating institutions may also submit indications of the effectiveness of their analytics. The institutions' own quantitative models, which in most cases are proprietary and secret, are generally not submitted to the blockchain.

Systems and methods generate metrics based on analysis of the participants' analytics submitted to the blockchain. The generated metrics are stored in the blockchain along with the analytics received from the participating banks and other institutions. As additional submissions of analytics about portfolio behavior and fraudulent activity are received, this information is combined with previously received and stored information and previously generated metrics. New and updated metrics are calculated and immutably stored. With each new iterative derivation of metrics based on an increasingly larger body of data and analytics, the quality and usefulness of derived metrics may improve.

Entirely new and useful metrics may also be created via these processes. When used in practice by blockchain participants, these institutions may experience better deposit management performance in part by identifying fraudulent activity more quickly.

Turning to the figures, FIG. 1 is a block diagram of a system for transaction ordering in a blockchain according to an embodiment of the present disclosure. FIG. 1 depicts components and interactions of a system 100 comprising a blockchain server 102, a blockchain 104, blocks 106a-c, transactions 108a-c, a collaboration application 110, and nodes 112a-c. The blockchain server 102 and the collaboration application 110 may be referred to hereafter for brevity purposes as the server 102 and the application 110, respectively.

It is assumed that each of blocks 106a-c comprises many transactions 108a-c, in embodiments many more than three per block 106a-c. While only three each of blocks 106a-c and nodes 112a-c are depicted in FIG. 1, it is assumed that a large number of blocks 106a-c and nodes 112a-c are present in the system 100. While the blockchain 104 and its blocks 106a-c and transactions 108a-c are depicted in FIG. 1 as resident and executing on the server 102, in embodiments these components may execute elsewhere on at least one other physical device separate from the server 102.

Transactions 108a-c are depicted in FIG. 1 only for block 106a so as not to unnecessarily crowd FIG. 1. But each of block 108b and block 108c may contain a multitude of transactions 108a-c in the same manner as does block 106a.

References herein to users or participants may in embodiments be equivalent to nodes 112a-c such that a user or participant described as submitting a transaction 108a-c for inclusion in block 106a-c may be assumed to be the actions of one of nodes 112a-c. In embodiments, more than one user or participant may be associated with a single node 112a-c. The terms user, participant, and node 112a-c may be used interchangeably herein.

Discussion about any of blocks 106a-c is assumed to apply to all blocks 106a-c unless otherwise stated. Discussion about any of transactions 108a-c is assumed to apply to all of transactions 108a-c unless otherwise stated. Discussion about any of nodes 112a-c is assumed to apply to all of nodes 12a-c unless otherwise stated.

The collaboration application 110 executes on the server 102 and executes most of the methods and actions described herein including generating metrics from data analytics as the data analytics are submitted for processing and storage by nodes 112a-c. The application 110 also commits received data analytics, derived metrics, and other electronic materials to the blockchain 104.

Transactions 108a-c may be groups of files comprising data and associated analytics submitted by nodes 112a-c for analysis by the collaboration application 110. Transactions 108a-c may also comprise derived metrics that are the result of processing described herein by the application 110. The term transaction 108a-c as used herein encompasses electronic material that is either submitted to the blockchain server 102 by nodes 112a-c or calculated by the collaboration application 110, stored in blocks 106a-c, and immutably committed to the blockchain 104.

Nodes 112a-c are parties that submit transactions 108a-c to the server 102 for processing by the application 110 and immutable commitment to the blockchain 104. Nodes 112a-c may be financial institutions such as banks and non-bank entities that accept and hold deposits from customers. Nodes 112a-c may be public entities including state, federal, and international entities that do not take deposits but are interested in banking industry stability. Regulatory agencies are examples of such public, non-bank entities with a stake in industry stability. Nodes 112a-c may also be non-governmental organizations (NGOs) interested in facilitating responsible banking in developing countries or regions or in low-income, disadvantaged, or blighted areas. The terms bank, participant and user may be used interchangeably herein with the term node 112a-c.

Submissions by the nodes 112a-c to the blockchain 104 for processing by the application 110 may exhibit both features and patterns that may provide for context to be understood. Institutions perform data mining to classify, cluster, and segment their deposit information and other data. Data mining can be used in combination with systems and methods provided herein to discern patterns that may indicate fraudulent or other adverse activity, particularly activity directed to bank deposits.

Derivation of metrics from data analytics by the application 110 may include computation of statistical parameters such as averages, quintiles, performance metrics, and probability distributions. Metrics generated by the application 110 based on submissions from nodes 112a-c may include dollar amounts and numbers of transactions, and wire transfers for a given account during a day, week, or month. Automated teller machine (ATM) transactions may also be examined for irregularities. Unusually large transactions, cash transactions, and cross-border transactions may also be of interest. Such activity, when gleaned from submissions by nodes 112a-c may constitute warning signs or "red flags" that participants should attend to.

Fraudulent activity may spread, as noted, from one bank to the next, particularly when victimized banks are of similar size, have similar deposit bases, and may be in the same geographic area. Such banks need not share their proprietary models and instead may share limited deposit data and analytics with the application 110. By combining the analytics and effectiveness information of two or more similar participants, the application 110 may generate helpful metrics that might not have been discernible to a single bank analyzing only its own information. It is in each bank's own interest as well as in the public interest to limit deposit fraud activity and support confidence in the banking industry.

Submissions by nodes 112a-c may effectively represent votes on metric usage results and on the success of new metrics identified by the application 110. Submissions by nodes 112a-c may be automatically committed by the application 110. In embodiments, submissions by nodes 112a-c would not be confirmed through explicit consensus of other nodes 112a-c or other components or parties. Nodes 112a-c may submit multiple entries that may indicated different results. Submissions may also contain references to demographics of the submitting institution's customers that may allow for evaluation of results with greater context. Chain code may be developed to assimilate submissions to highlight effective patterns over sets of demographics.

An example submission for two features and two patterns may comprise an Activity Burst model. Features may support parameterization. A more complete entry to the blockchain 104 may include further input providing context including type of bank, type of fraud suspected or confirmed, assessment period, and primary geographic region.

As noted, participants associated with nodes 112a-c may effectively vote on or indicated their level of satisfaction with metrics generated by the system, whether the metrics are generated as extensions of analytics provided by nodes 112a-c or are entirely newly generated by the collaboration application 110. By directing submissions for processing and storage to some metrics and less to others, participants indicated their support for established as well as newly created metrics. By not directing submissions to other metrics, participants may effectively be indicating that the other metrics are not as useful or relevant to the problems the participants face.

In embodiments, the application 110 may publish rankings of metrics as well as some comments by participants regarding their use of some metrics and suggestions they may have about improving a metric or using a metric in a certain way. This information may be of value to other participants. Participants are encouraged to publish results of using metrics generated by the system. The rankings of that are published may be tallied as votes for metrics with ranking classifications for such categories as "most used", "most reliable", "most durable" and so forth.

FIG. 1B illustrates a chart describing an example ledger entry depicting features and patterns in an activity burst model according to an embodiment of the present disclosure. Two examples of potential risk areas or warning signs are illustrated. The first example risk area is the occurrence of three or more transactions involving a in a high-risk jurisdiction in a fourteen day period to the same beneficiary wherein the transactions total at least $50,000 and each transaction is at least $5,000 in size. The acronym BNF stands for beneficiary. A high-risk jurisdiction may be a geographic area experiencing a high crime rate. Feature 1 and Feature 2 break out the variables in this risk area that are being examined, for example the number of transactions in high-risk jurisdictions, the threshold of which is three. The acronym TXN stands for transactions. Feature 2 is the dollar amount threshold, in this example $50,000. Also shown are percent (%) of activation metrics for the two features.

The second example risk area is directed to occurrence of twenty or more transactions in a thirty-day period and the total amount of transactions is at least $3,000. FIG. 1B illustrates the two features in the manner as discussed above for the first example with thresholds shown. A fuller ledger entry for the features comprising an activity burst model may include more entries and additional context for the data operations including bank type, fraud type, assessment period, and primary geographic region.

Figure 2A:
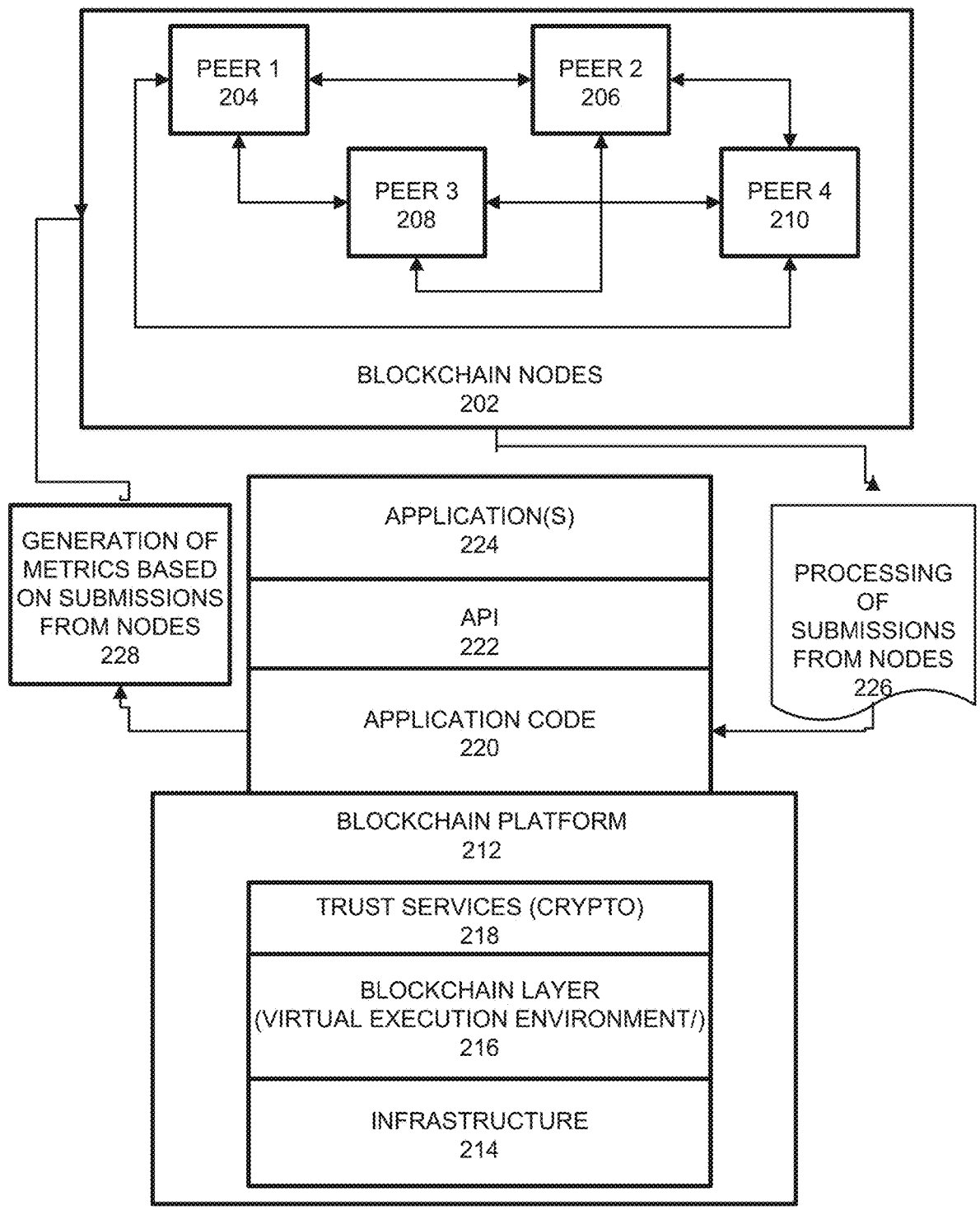
FIG. 2A illustrates an example peer node blockchain architecture configuration for collaborative analytics for fraud detection through a shared public ledger scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210. Four nodes are depicted for discussion purposes only. These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, transaction set information 226 for processing of submissions from nodes 112a-c may be processed by one or more processing entities (e.g., virtual machines) included in the blockchain layer 216. The result 228 may include generation of metrics as described herein. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, analytics may be received from nodes 112a-c and processed to derive metrics that may be useful to participants. One function may be to selectively distribute or publish the derived metrics to nodes 112a-c that have indicated an interest in receiving this material. This material may be provided to one or more of the nodes 204-210.

Figure 2B:
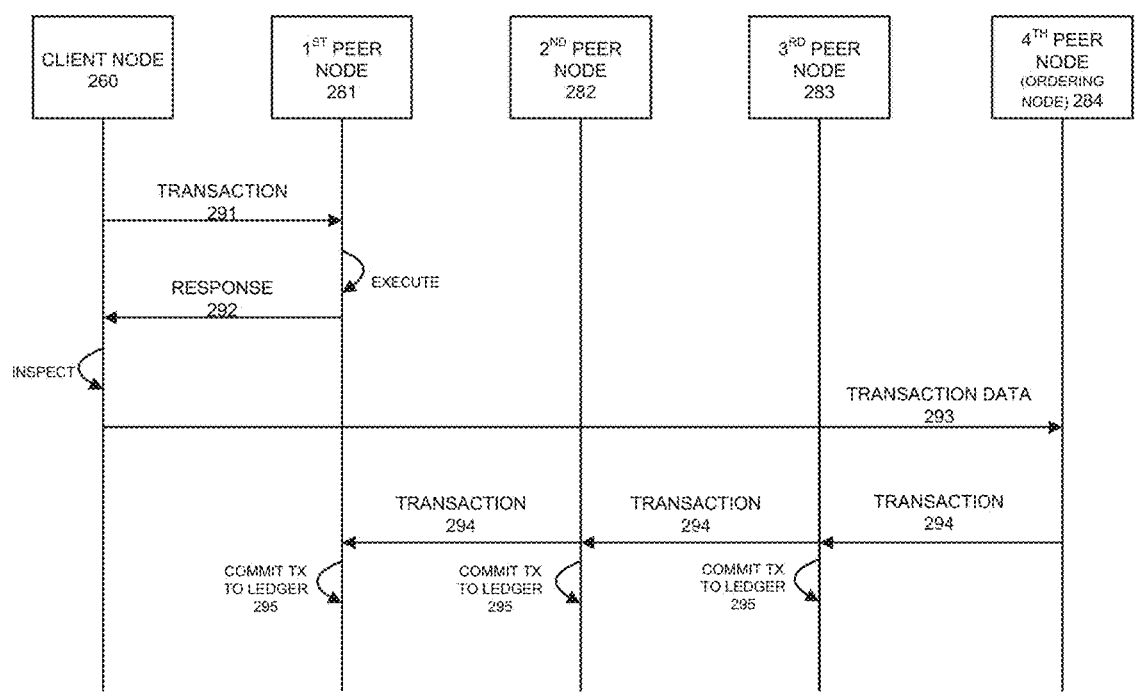
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
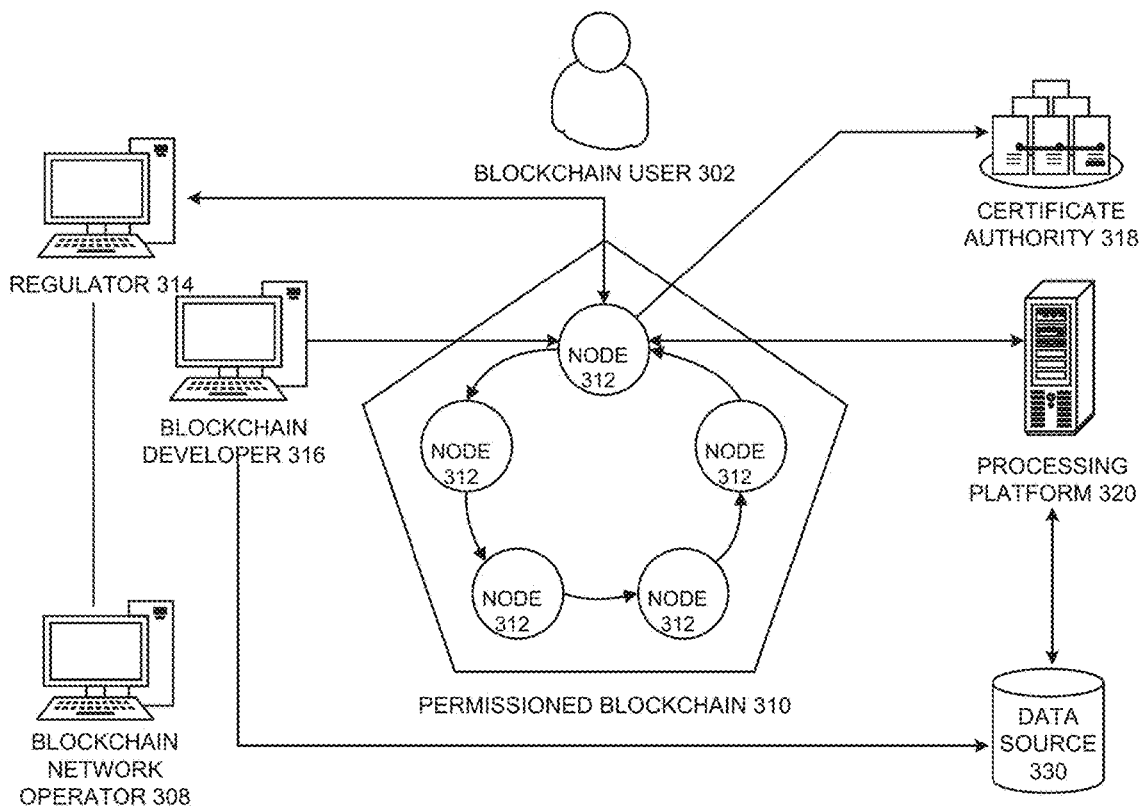
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4A:
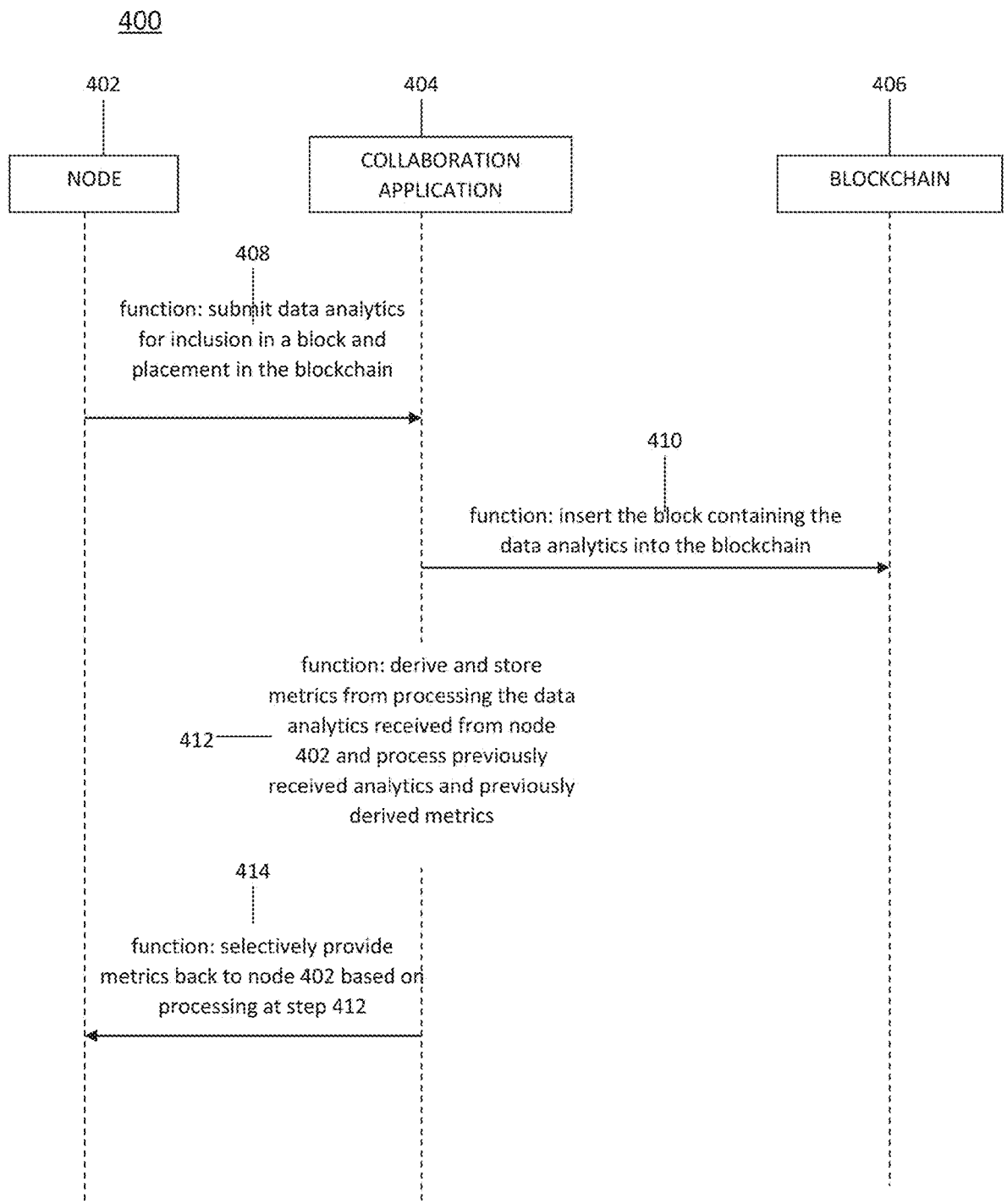
FIG. 4A illustrates a system messaging diagram for performing collaborative analytics for fraud detection through a shared public ledger, according to example embodiments.

FIG. 4A illustrates a system messaging diagram 400 for collaborative analytics for fraud detection through a shared public ledger according to example embodiments. Referring to FIG. 4A, the system diagram 400 includes a node 402 that corresponds to the nodes 112a-c provided by the system 100 herein. The system diagram 400 also depicts a collaboration application 404 that corresponds to the collaboration application 110 provided by the system 100. The system diagram 400 also depicts a blockchain 406 that corresponds to the blockchain 108 provided by the system 100.

The messaging begins at block 408 with a function: submit data analytics for inclusion in a block and placement in the blockchain. The messaging continues at block 410 with a function: insert the block containing the data analytics into the blockchain.

The messaging continues at block 412 with a function: derive and store metrics from processing the data analytics received from node 402 and process previously received analytics and previously derived metrics. The messaging concludes at block 414 with a function: selectively provide metrics back to node 402 based on processing at step 412.

Figure 4B:
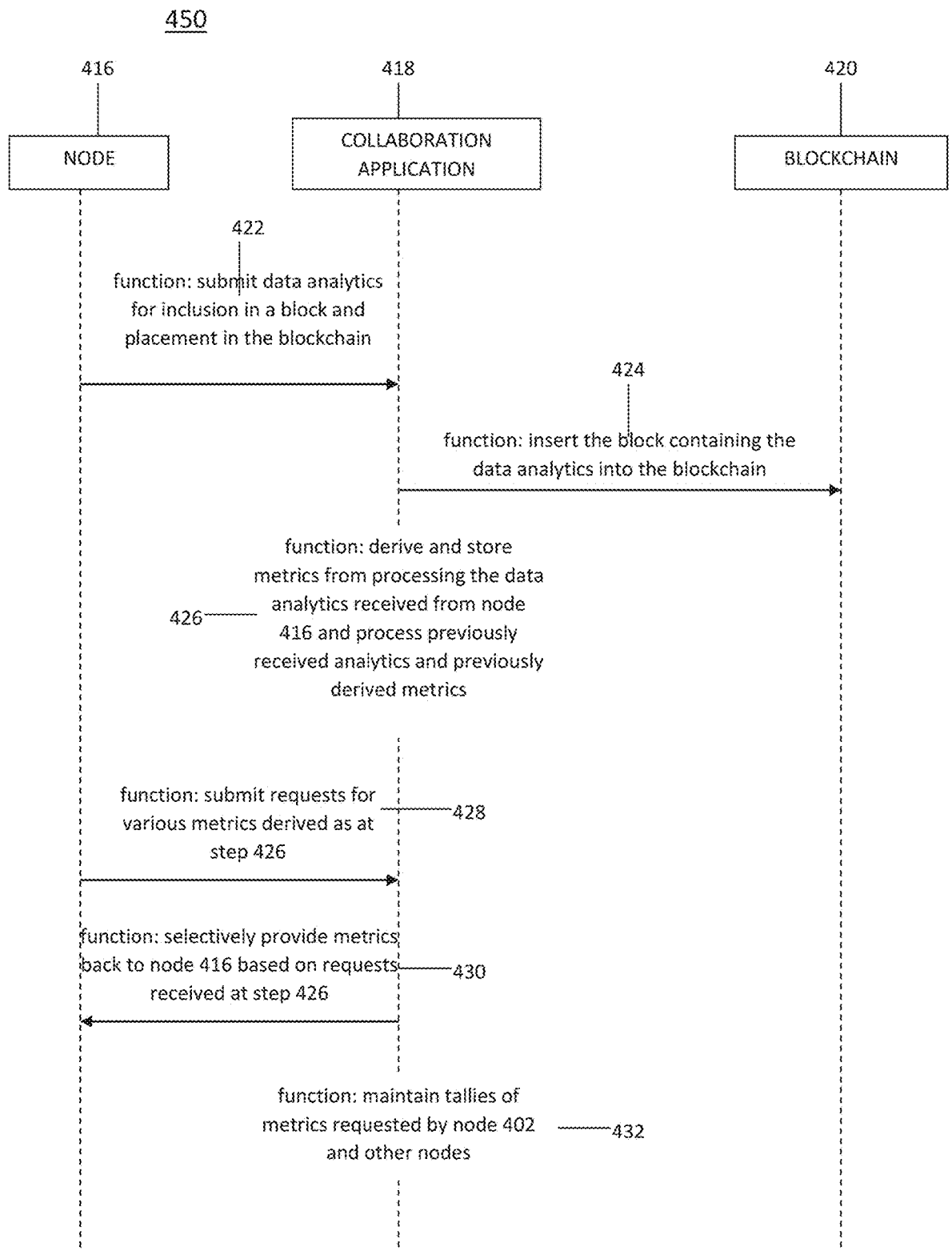
FIG. 4B illustrates a system messaging diagram for performing collaborative analytics for fraud detection through vote submission in a shared public ledger, according to example embodiments.

FIG. 4B illustrates a system messaging diagram 450 for collaborative analytics for fraud detection through a shared public ledger according to example embodiments. Referring to FIG. 4B, the system diagram 450 includes a node 416 that corresponds to the nodes 112a-c provided by the system 100 herein. The system diagram 450 also depicts a collaboration application 418 that corresponds to the collaboration application 110 provided by the system 100. The system diagram 450 also depicts a blockchain 420 that corresponds to the blockchain 108 provided by the system 100. The node 416, the collaboration application 418, and the blockchain 420 correspond to the node 402, the collaboration application 404, and the blockchain 406 depicted in FIG. 4A and are numbered differently so as to avoid any confusion between FIG. 4A and FIG. 4B.

The messaging begins at block 422 with a function: submit data analytics for inclusion in a block and placement in the blockchain. The messaging continues at block 424 with a function: insert the block containing the data analytics into the blockchain.

The messaging continues at block 426 with a function: derive and store metrics from processing the data analytics received from node 416 and process previously received analytics and previously derived metrics. The messaging continues at block 428 with a function: submit requests for various metrics derived as at step 426. The messaging continues at block 430 with a function: selectively provide metrics back to node 416 based on requests received at step 426. The messaging concludes at block 432 with a function: maintain tallies of metrics requested by node 416 and other nodes.

Figure 5A:
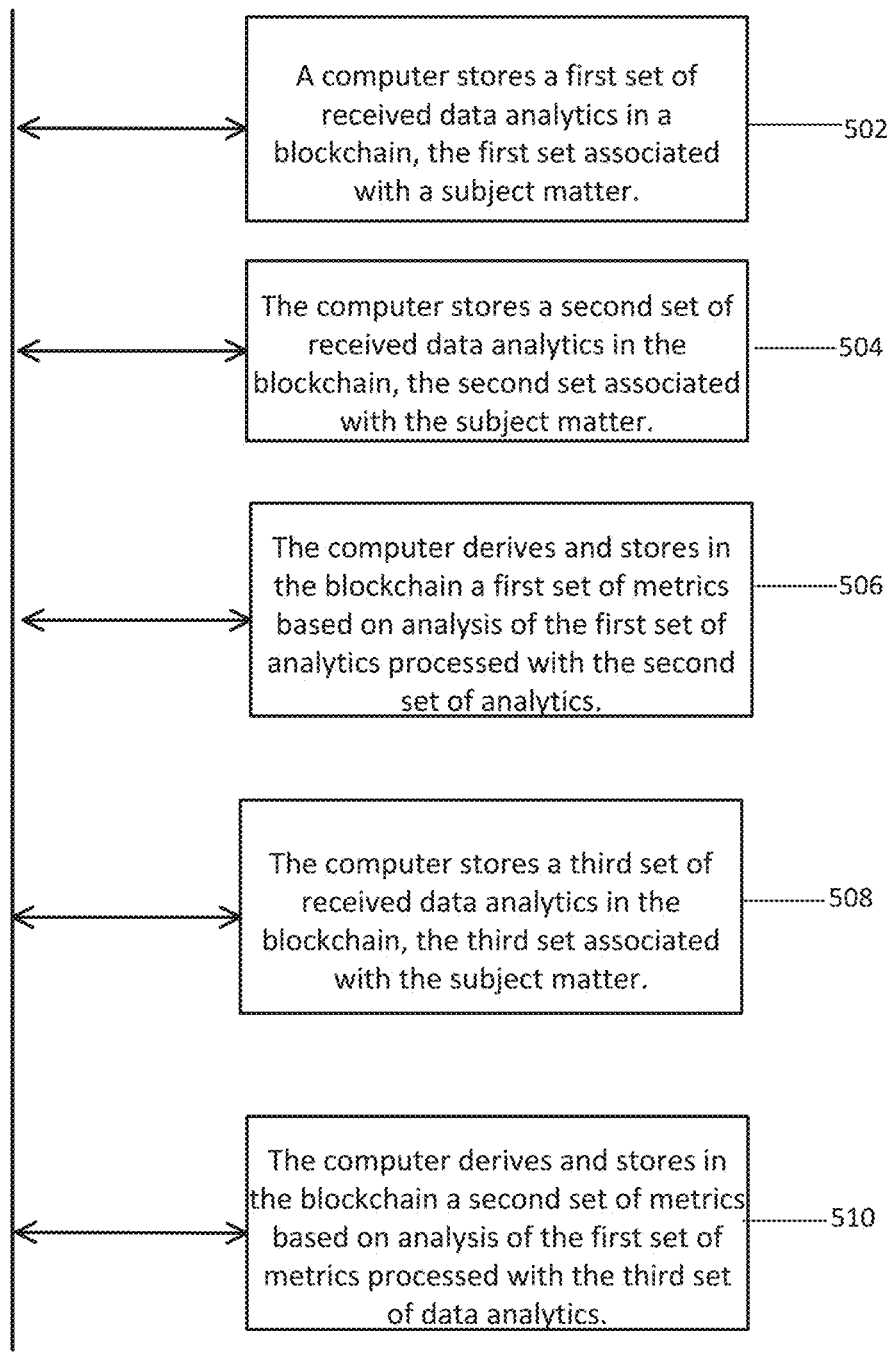
FIG. 5A illustrates a flow diagram of an example method of collaborative analytics for fraud detection through a shared public ledger, according to example embodiments.
Figure 5B:
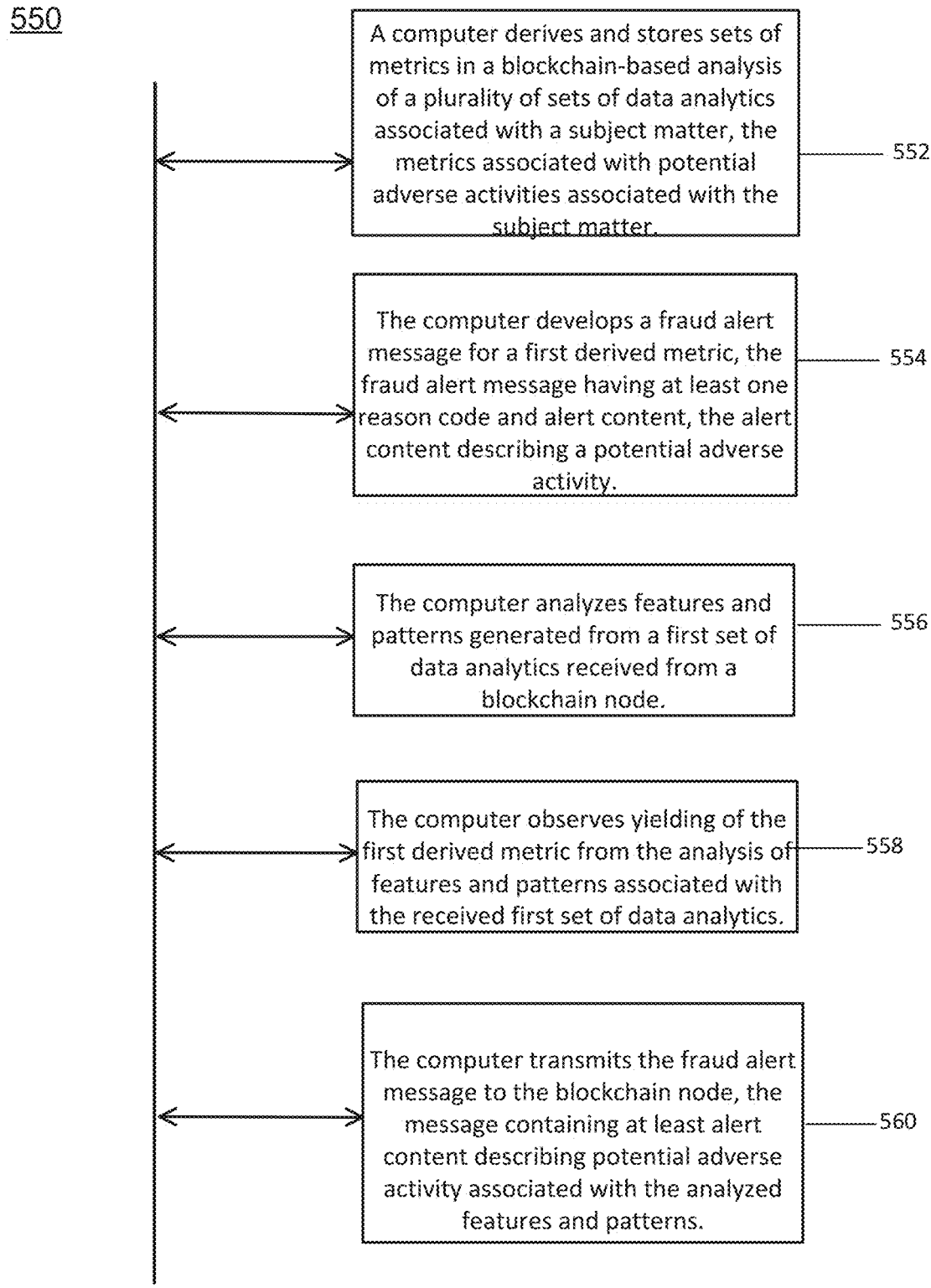
FIG. 5B illustrates a flow diagram of an example method of collaborative analytics for fraud detection through a shared public ledger, according to example embodiments.

FIG. 5A illustrates a flow diagram 500 of an example method of collaborative analytics for fraud detection through a shared public ledger, according to example embodiments. Referring to FIG. 5A, the method 500 begins at block 502. At block 502, a computer stores a first set of received data analytics in a blockchain, the first set associated with a subject matter. At block 504, the computer stores a second set of received data analytics in the blockchain, the second set associated with the subject matter. At block 506, the computer derives and stores in the blockchain a first set of metrics based on analysis of the first set of analytics processed with the second set of analytics. At block 508, the computer stores a third set of received data analytics in the blockchain, the third set associated with the subject matter. At block 510, the computer derives and stores in the blockchain a second set of metrics based on analysis of the first set of metrics processed with the third set of data analytics. The method 500 thereafter ends FIG. 5B illustrates a flow diagram 550 of an example method of collaborative analytics for fraud detection through a shared public ledger, according to example embodiments. The example method may supplement steps of the method 500 discussed above. The example method may also include a a computer at block 552 deriving and storing sets of metrics in a blockchain-based analysis of a plurality of sets of data analytics associated with a subject matter, the metrics associated with potential adverse activities associated with the subject matter. At block 554, the example method includes the computer developing a fraud alert message for a first derived metric, the fraud alert message having at least one reason code and alert content, the alert content describing a potential adverse activity.

At block 556, the example method includes the computer analyzing features and patterns generated from a first set of data analytics received from a blockchain node. At block 558, the example method includes the computer observing yielding of the first derived metric from the analysis of features and patterns associated with the received first set of data analytics. At block 560, the example method includes transmitting the fraud alert message to the blockchain node, the message containing at least alert content describing potential adverse activity associated with the analyzed features and patterns. The interactions of the flow diagram 550 thereafter end.

Figure 5C:
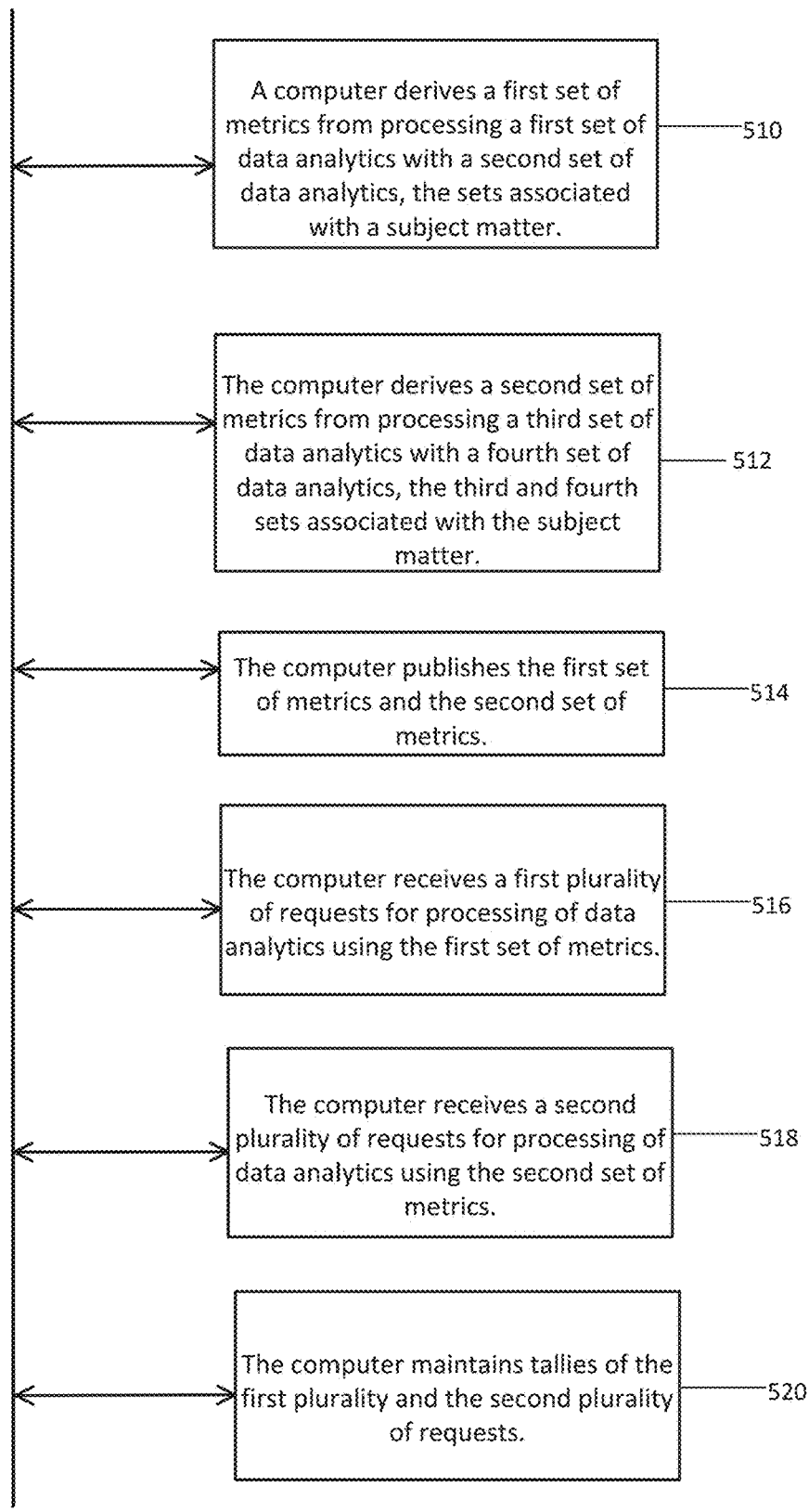
FIG. 5C illustrates a flow diagram of an example method of collaborative analytics for fraud detection through vote submission in a shared public ledger, according to example embodiments.

FIG. 5C illustrates a flow diagram 580 of an example method of collaborative analytics for fraud detection through a shared public ledger, according to example embodiments. Referring to FIG. 580, the method begins at block 510. At block 510, a computer derives a first set of metrics from processing a first set of data analytics with a second set of data analytics, the sets associated with a subject matter. At block 512, the computer derives a second set of metrics from processing a third set of data analytics with a fourth set of data analytics, the third and fourth sets associated with the subject matter. At block 514, the computer publishes the first set of metrics and the second set of metrics. At block 516, the computer receives a first plurality of requests for processing of data analytics using the first set of metrics. At block 518, the computer receives a second plurality of requests for processing of data analytics using the second set of metrics. At block 520, the computer maintains tallies of the first plurality and the second plurality of requests. The method thereafter ends.

Figure 5D:
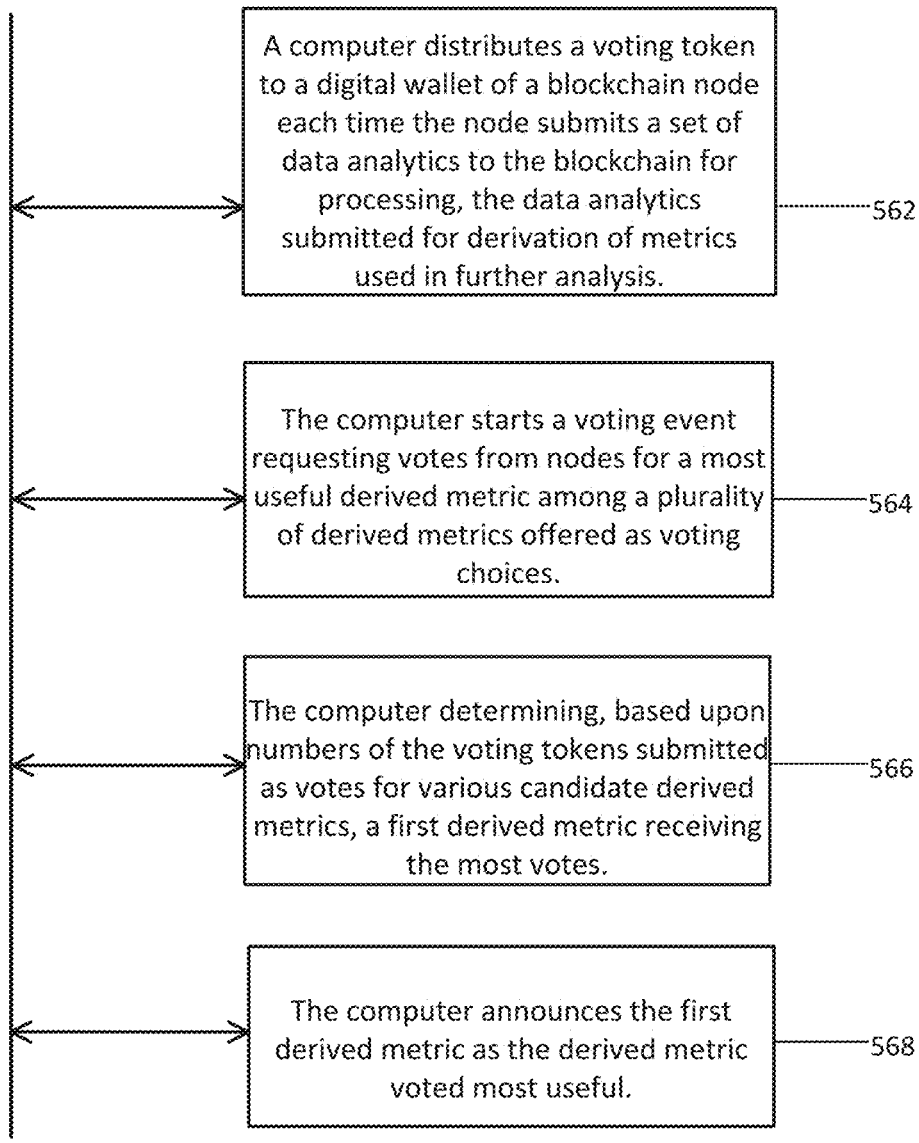
FIG. 5D illustrates a flow diagram of an example method of collaborative analytics for fraud detection through vote submission in a shared public ledger, according to example embodiments.

FIG. 5D illustrates a flow diagram 590 of an example method of collaborative analytics for fraud detection through a shared public ledger, according to example embodiments. The example method may supplement steps of methods discussed above. The example method may include a computer at block 562 distributing a voting token to a digital wallet of a blockchain node each time the node submits a set of data analytics to the blockchain for processing, the data analytics submitted for derivation of metrics used in further analysis. The example method may include the computer at block 564 starting a voting event requesting votes from nodes for a most useful derived metric among a plurality of derived metrics offered as voting choices. The example method may include the computer at block 566 determining, based upon numbers of the voting tokens submitted as votes for various candidate derived metrics, a first derived metric receiving the most votes. The example method may include the computer announcing at block 568 the first derived metric as the derived metric voted most useful. The interactions of the flow diagram 590 thereafter end.

Figure 6A:
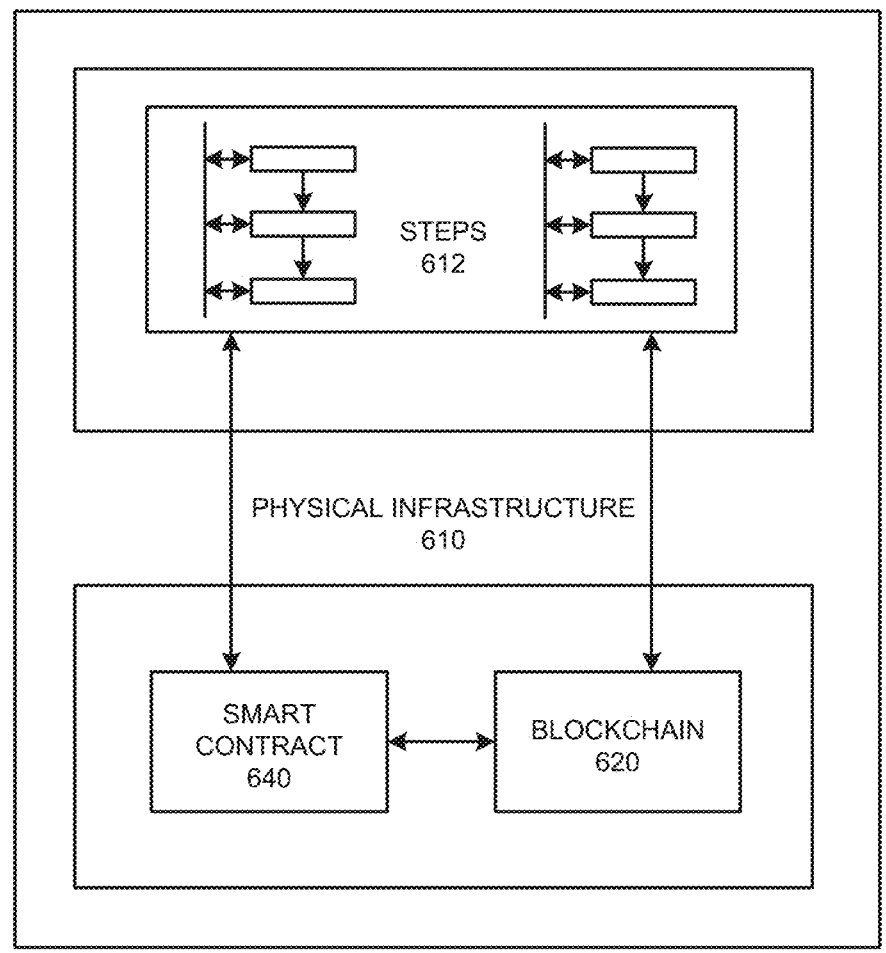
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
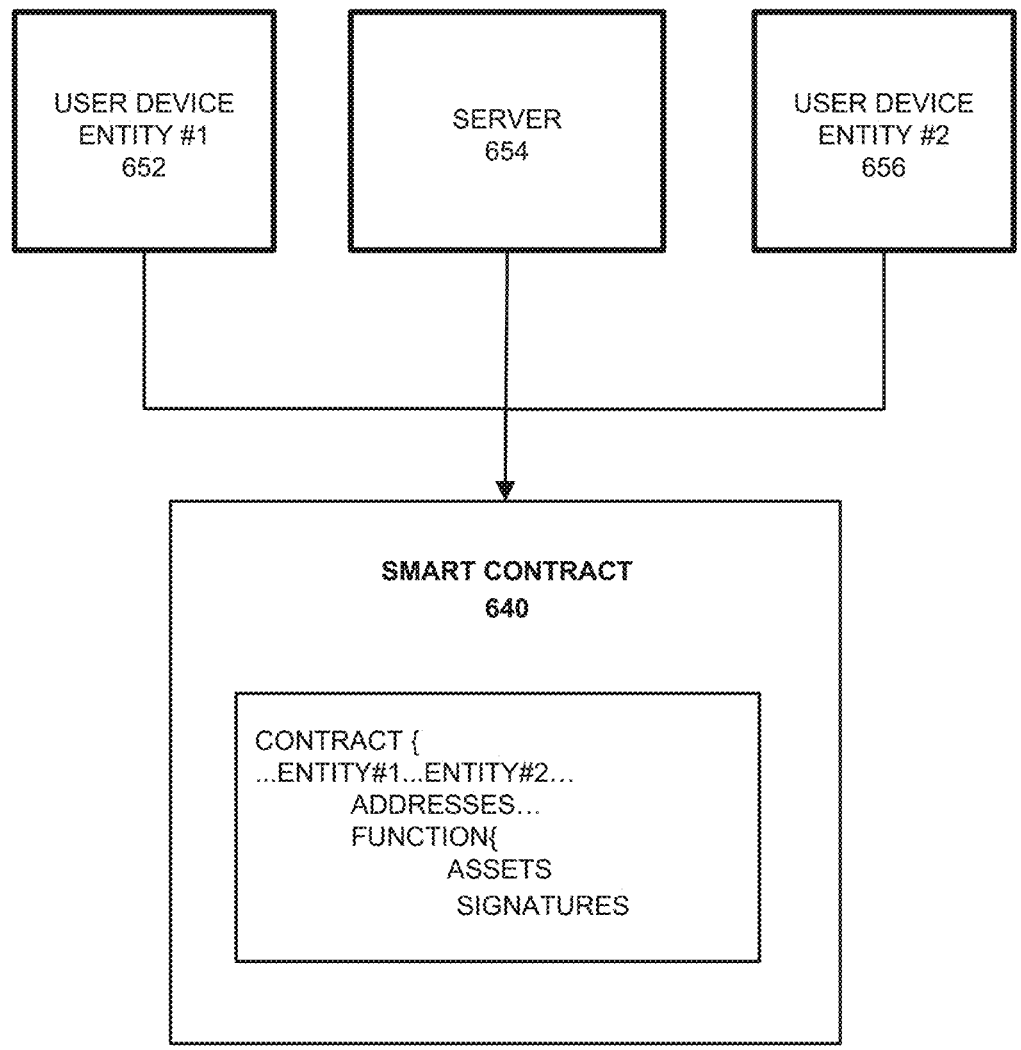
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 7:
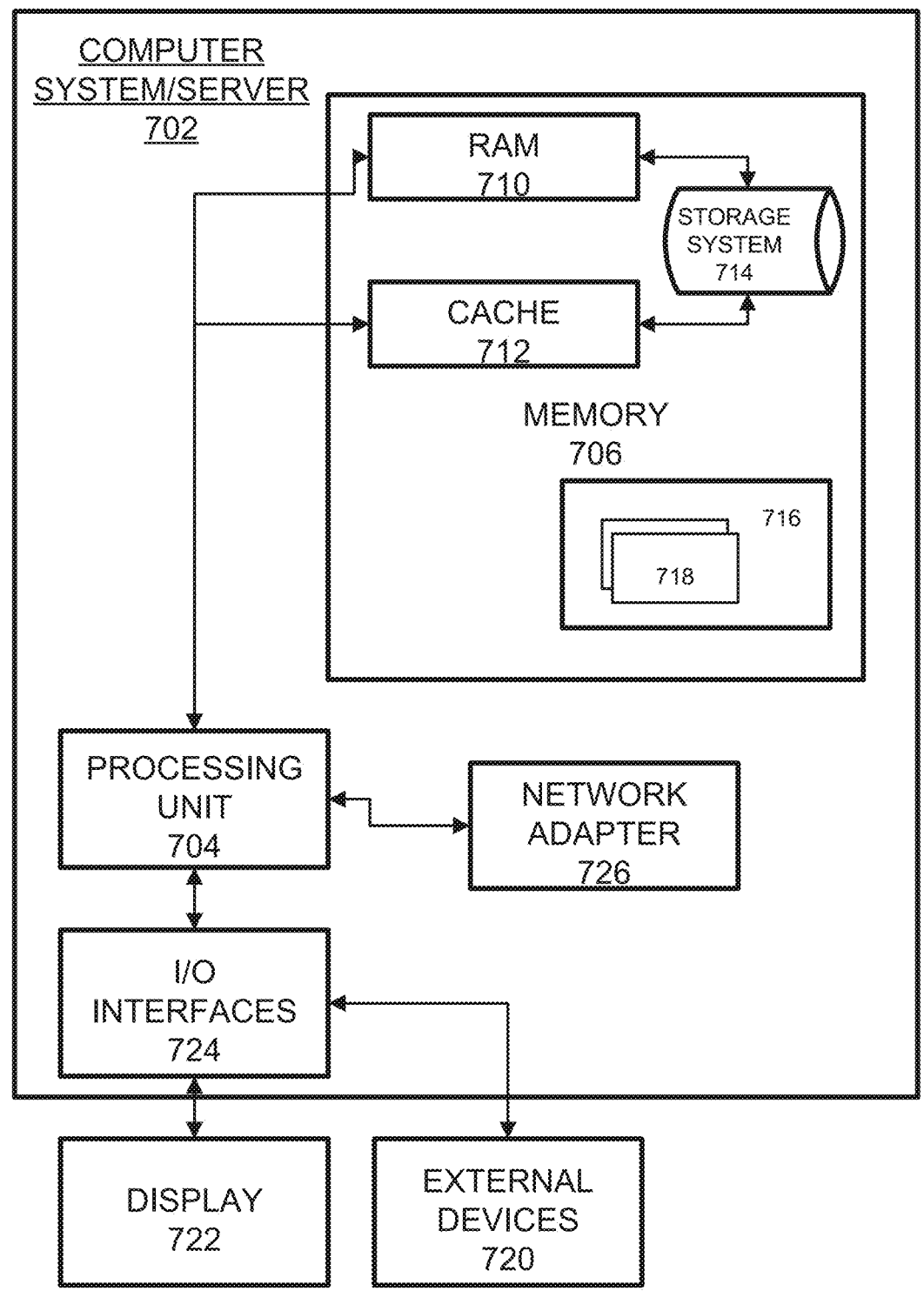
FIG. 7 illustrates an example computer system configured to support one or more of the example embodiments.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc. The server 102 provided by the system 100 herein may contain all or a portion of the example computer system architecture 700.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed.

Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   receiving, via a blockchain server, a submission of a first set of data analytics from a node of a first data source which is directed to a metric;
   distributing a voting token for the metric to a digital wallet of the node of the first data source;
   receiving, via the blockchain server, a submission of a second set of data analytics from a node of a second data source which is directed to the metric;
   distributing a second voting token for the metric to a digital wallet of the node of the second data source;
   determining to derive the metric based on the distributed first and second voting tokens;
   combining the first set of data analytics and the second set of data analytics to generate the derived metric and storing the derived metric in a chain of blocks on a shared blockchain ledger;
   executing, via the blockchain server, a collaborative application which detects a collaborative pattern of fraudulent activity across the combination of the first and second sets of data analytics from the first and second data sources; and
   transmitting an alert regarding the detected fraudulent activity to a computing system.

2. The method of claim 1, wherein the combining comprises storing the first and second sets of data analytics in a blockchain structure on the shared blockchain ledger.

3. The method of claim 1, wherein the first and second sets of analytics are based on user transactional behavior that comprises bank deposit activity.

4. The method of claim 3, wherein the executing of the collaborative application detects fraud associated with bank deposit activity across first and second financial institutions associated with the first and second data sources.

5. The method of claim 1, further comprising soliciting commentary and ratings from the first and second data sources regarding the first and second sets of data analytics.

6. The method of claim 5, further comprising classifying the first and second sets of data analytics based on at least one of usability, reliability, and durability, using the solicited commentary and ratings from the first and second data sources.

7. A system comprising:
   a memory;
   a processor;
   an application stored in the memory that when executed on the processor:
      receives a submission of a first set of data analytics from a node of a first data source which is directed to a metric;
      distributes a voting token for the metric to a digital wallet of the node of the first data source;
      receives a submission of a second set of data analytics from a node of a second data source which is directed to the metric;
      distributes a second voting token for the metric to a digital wallet of the node of the second data source;
      determines to derive the metric based on the distributed first and second voting tokens;
      combines the first set of data analytics and the second set of data analytics to generate the derived metric and store the derived metric in a chain of blocks on a shared blockchain ledger;
      executes, via the blockchain server, a collaborative application which detects a collaborative pattern of fraudulent activity across the combination of the first and second sets of data analytics from the first and second data sources; and
      transmits an alert regarding the detected fraudulent activity to a computing system.

8. The system of claim 7, wherein the application stores the first and second sets of data analytics in a blockchain structure on the shared blockchain ledger.

9. The system of claim 7, wherein the first and second sets of data analytics are based on user transactional behavior that comprises bank deposit activity.

10. The system of claim 9, wherein the detected fraudulent activity is associated with the bank deposit activity.

11. The system of claim 7, wherein the application solicits commentary and ratings from the first and second data sources regarding the first and second sets of data analytics.

12. The system of claim 11, wherein the application classifies the first and second sets of data analytics based on at least one of usability, reliability, and durability, using the solicited commentary and ratings from the first and second data sources.

13. A non-transitory computer readable medium comprising instructions, that when read by a processor, cause the processor to perform a method comprising:
   receiving, via a blockchain server, a submission of a first set of data analytics from a node of a first data source which is directed to a metric;
   distributing a voting token for the metric to a digital wallet of the node of the first data source;
   receiving, via a blockchain server, a submission of a second set of data analytics from a node of a second data source which is directed to the metric;
   distributing a second voting token for the metric to a digital wallet of the node of the second data source;
   determining to derive the metric based on the distributed first and second voting tokens;
   combining the first set of data analytics and the second set of data analytics to generate the derived metric and storing the derived metric in a chain of blocks on a shared blockchain ledger;
   executing, via the blockchain server, a collaborative application which detects a collaborative pattern of fraudulent activity across the combination of the first and second sets of data analytics generated by the first and second data sources; and
   transmitting an alert regarding the detected fraudulent activity to a computing system.

14. The non-transitory computer readable medium of claim 13, wherein the combining comprises storing the first and second sets of data analytics in a blockchain structure on the shared blockchain ledger.

15. The non-transitory computer readable medium claim 13, wherein the instructions further cause the processor to solicit commentary and ratings from the first and second data sources regarding the first and second sets of data analytics.

16. The non-transitory computer readable medium of claim 13, wherein the instructions further cause the processor to classify the first and second sets of data analytics based on at least one of usability, reliability, and durability, using the solicited commentary and ratings from the first and second data sources.

\* \* \* \* \*